June 5, 1951  F. H. DRAKE  2,555,846
TELESCOPED COUPLING
Filed June 14, 1946
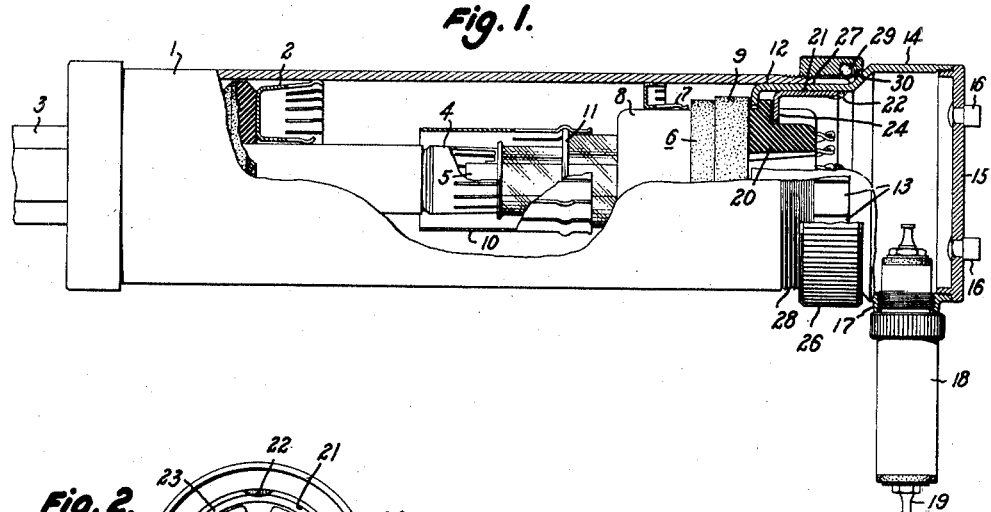
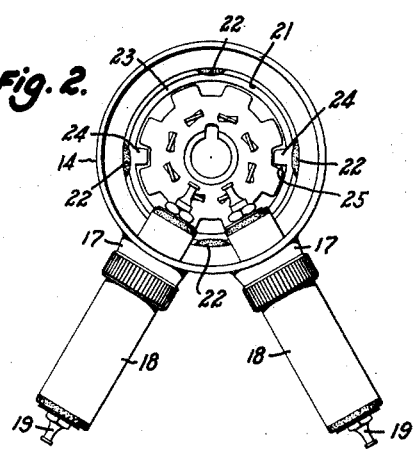
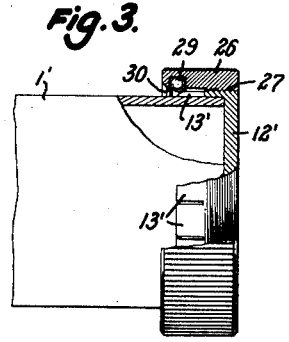
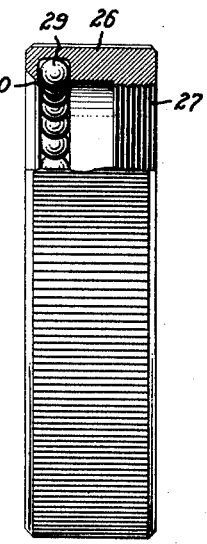
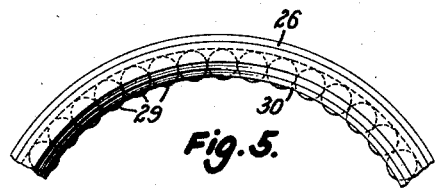
Inventor:
Frederick H. Drake,
By Pierce + Scheffler,
Attorneys.

Patented June 5, 1951

2,555,846

UNITED STATES PATENT OFFICE 2,555,846

TELESCOPED COUPLING

Frederick H. Drake, Boonton, N. J., assignor to Aircraft Radio Corporation, Boonton, N. J., a corporation of New Jersey Application June 14, 1946, Serial No. 676,682

9 Claims. (Cl. 220—61)

This invention relates to telescoped couplings for detachably securing parts to each other, and more specifically to shielded electrical housings with telescoped end closures which may be readily removed or replaced from time to time for the inspection or replacement of electrical devices.

Various forms of telescoped rod and pipe couplings have been proposed but, in general, the prior telescoped couplings have required the use of tools to effect a substantially rigid and tight coupling of the telescoped elements. Such couplings were not entirely satisfactory as it was necessary to carry tools into the field when the telescoped coupling was incorporated in a portable apparatus, and there was the possibility of mechanical damage if the appropriate tools were not used or were subjected to abnormal stresses.

An object of the present invention is to provide telescoped couplings which may be rigidly set up without the use of tools or other auxiliary equipment. An object is to provide a telescoped coupling of cylindrical members which include flexible fingers on one cylindrical member and a pressure ring of rotatable balls which may be adjusted axially of the telescoped members to exert radial pressure upon the flexible fingers. More specifically, an object is to provide shielded electrical housings having telescoped closures which require no tools for their removal and replacement. An object is to provide a shielded electrical housing having a tubular end into which a cylindrical closure is telescoped and mechanically clamped to form a rigid and completely shielded assembly.

These and other objects and advantages of the invention will be apparent from the following specification when taken with the accompanying drawings in which:

Fig. 1 is an elevation, with parts in section, of a cavity resonator or ultra high frequency oscillator which includes a telescoped coupling embodying the invention;

Fig. 2 is an end elevation of the removable closure, as seen from the outer end and with the end cap removed, Fig. 3 is a fragmentary elevation, with parts in section, of another housing and removable closure construction;

Fig. 4 is a larger scale elevation, with parts broken away, of the ball-bearing clamping nut; and Fig. 5 is a fragmentary end view of the clamping nut.

In the drawings, the reference numeral 1 identifies the cylindrical shell of a resonator cavity having an end wall 2 which may be longitudinally adjustable through means, not shown, and an axially supported tube 3 which carries a split socket 4 for receiving the anode cap 5 of a vacuum tube 6 of the so-called "lighthouse type." A resilient sleeve 7 within the shell 1 has an internal diameter for receiving, with a relatively snug fit, the metallic tube shell 8 which is connected electrically to the tube cathode and extends axially from the base 9 of the tube. A grid sleeve 10 is telescoped over the control grid ring 11 to engage a grid leak connection, not shown, when the tube is in position within the cavity. The elements so far described may be of any desired form and construction as they form no part of the present invention.

The other closure for the cylindrical cavity shell 1 has an inner section 12 which telescopes into the end of the shell 1 which is axially split to provide a series of clamping fingers 13, and an outer section 14 of somewhat larger diameter which is internally threaded to receive an end cap 15 having diametrically disposed lugs 16 to which a straight edged device may be applied to rotate the cap into closed position. The outer section 14 is provided with one or more threaded bosses 17 into which are threaded the metal shield tubes 18 of ferro-magnetic chokes, not shown, which surround the terminal rods 19.

A tube socket 20 of the molded disk type extends across the inner end of the closure and is supported for limited angular and radial movement between the inturned flanges of the closure section 12 and of an anchoring sleeve 21. The sleeve 21 fits snugly within the closure section 12 to which it is secured, when firmly pressed against the socket 20, by a number of circumferentially spaced spots of solder 22. The inturned flange 23 of the sleeve 21 has diametrically opposed projections 24 which interlock, with substantial circumferential and radial clearance, with recesses 25 in the lower portion of the socket disk 20. The differential heating and attendant differential expansion of the closure shell and the sleeve 21 during the soldering operation result in a slight axial clearance, of the order of thousandths of an inch between the tube socket 20 and its supporting flanges, which permits a free angular and transverse adjustment of the socket 20 but which prevents any substantial axial movement of the socket 20 and tube 6.

The end closure and tube mount are secured to the shell 1 of the cavity by a clamping member or nut 26 having a cylindrical and milled outer surface and an internally threaded inner end 27 for engagement with threads 28 on the cavity shell 1 adjacent the clamping fingers 13. The nut 26 is counterbored from its outer end and circumferentially grooved to receive a series of small balls 29 which are retained in the groove by the inturned end flange 30 of the nut. The fingers or strips 13 are of less external diameter than the threads 28 to provide clearance for the threaded section 27 of the nut and also to increase the flexibility of the fingers 13. The ends of the fingers 13 are beveled, preferably at an angle of about 30° to the axis of the shell 1, and the balls 29 roll along these beveled surfaces when the nut 26 is threaded upon the shell 1.

The apparatus is assembled by placing the nut 26 upon the shell 1 and rotating it to engage the threads 28. The tube 6 is placed in its socket 20, and the closure and tube are inserted within the shell 1, and then advanced to seat the tube anode cap 5 fully within its socket 4. The tube 6 is not subjected to bending stresses as the sliding mounting of the tube socket 20 permits sufficient transverse movement of the tube to compensate for such variations in dimensions or symmetry as arise in commercial manufacture. The nut 26 is then turned down by hand to force the balls 29 against the beveled ends of the fingers 13 to flex the fingers into firm clamping engagement with the sections 12 of the closure.

The mechanical connection of the closure and housing is rigid and the electrical shielding is complete. The closure may be removed from the housing without the use of tools by backing the nut 26 from the threads 28 to release the clamping pressure applied to the fingers 13.

The relative arrangement of the rigid shell and the clamping finger elements of the telescoped housing and closure members may of course be reversed, as shown in Fig. 3, in which a cup-shaped end closure 12' with clamping fingers 13' is telescoped over a housing shell 1'. The clamping nut 26 with balls 29 is threaded upon the end closures 21'.

The invention may of course be employed for the rigid, but easily detachable, assembly of other types of telescoped rod and/or pipe elements. Claims to the illustrated apparatus as a shielded tube support are presented in my copending application Ser. No. 779,172, filed October 10, 1947, Tube Support and Shield, now Patent No. 2,478,574.

The illustrated embodiments of the invention indicate that there is considerable latitude in the construction of telescoped couplings, and that various modifications of the illustrated constructions fall within the spirit and scope of the invention as set forth in the following claims.

I claim:

1. In a telescoped coupling, a tubular member having external threads adjacent one end thereof, said member being axially slotted beyond said threads to terminate in resilient fingers having sloping end faces, and a clamping member threaded internally to engage the threads of said tubular member; said clamping member having a circumferential groove, an annular assembly of balls rotatably mounted in said groove to ride upon the sloping end surfaces of said resilient fingers upon rotation of said clamping member with respect to said tubular member, and a flange on said clamping member for retaining said balls in said groove.

2. In a telescoped coupling, the invention as recited in claim 1, wherein said clamping member has a cylindrical external surface, said surface being milled to facilitate direct manual rotation of the clamping member.

3. A housing and removable assembly comprising the combination of a housing having a tubular end portion, a closure having a tubular portion in telescoped relation to said tubular portion of the housing, one of said tubular portions being axially slotted to terminate in resilient fingers having sloping end faces, a clamping member and means for moving the same axially of said telescoped portions upon rotation of the clamping member, said clamping member being circumferentially grooved, and an annular assembly of balls rotatably mounted in said groove and retained therein by an overhanging flange of said clamping member to roll upon the sloping end faces of said resilient fingers upon rotation of said clamping member.

4. A housing and removable closure assembly as recited in claim 3, wherein the outer of said telescoped tubular portions is slotted to provide said resilient fingers, and said outer telescoped portion and said clamping member have cooperating threads for moving the clamping member axially upon rotation of the same.

5. A housing comprising a housing shell and a telescoped closure shell, an end of one of said shells being axially split to provide a series of clamping fingers with beveled end surfaces, and a nut threaded upon one of said shells and carrying a series of balls to engage the beveled end surfaces of said clamping fingers to force them into engagement with the other shell; said nut being circumferentially grooved to provide a race for said balls, and including means to retain said balls in said race upon removal of the nut from said shells.

6. A housing as recited in claim 5, wherein an end of said housing shell is axially split to provide the clamping fingers, and said closure shell is telescoped within said housing shell.

7. A housing as recited in claim 5, wherein an end of said closure shell is axially split and telescoped over the housing shell.

8. A housing as recited in claim 5, wherein an end of said housing shell is axially split, said closure shell is telescoped within the axially split end of said housing shell, and said nut is threaded upon the housing shell.

9. A housing as recited in claim 5, wherein said closure shell is axially split and telescoped over said housing shell, and said nut is threaded upon said closure shell.

FREDERICK H. DRAKE.

REFERENCES CITED

The following references are of record in the file of this patent:

UNITED STATES PATENTS

| Number | Name | Date |
| --- | --- | --- |
| 692,881 | Lindsay | Feb. 11, 1902 |
| 1,485,252 | Denis | Feb. 26, 1924 |
| 1,644,697 | Tornsjo | Oct. 11, 1927 |
| 2,121,843 | Vaughn | June 28, 1938 |
| 2,219,941 | Rochow | Oct. 29, 1940 |
| 2,221,064 | Tobler | Nov. 12, 1940 |
| 2,250,477 | Fleischman | July 29, 1941 |
| 2,252,488 | Bierend | Aug. 12, 1941 |
| 2,286,152 | Miller | June 9, 1942 |
| 2,310,744 | Osborn | Feb. 9, 1943 |
| 2,362,034 | Stahl | Nov. 7, 1944 |
| 2,398,553 | Nyden | Apr. 16, 1946 |
| 2,478,574 | Drake | Aug. 9, 1949 |

FOREIGN PATENTS

| Number | Country | Date |
| --- | --- | --- |
| 467,954 | Germany | Dec. 29, 1926 |